(12) United States Patent
Holder et al.

(10) Patent No.: US 11,538,203 B2
(45) Date of Patent: Dec. 27, 2022

(54) CAPABILITY ENVELOPE DISPLAY METHODS AND SYSTEMS

(71) Applicant: HONEYWELL INTERNATIONAL INC., Charlotte, NC (US)

(72) Inventors: Barbara Holder, Deer Valley, AZ (US); Michael Dillard, St. Louis Park, MN (US); Stephen Whitlow, St. Louis Park, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/316,384

(22) Filed: May 10, 2021

(65) Prior Publication Data

US 2022/0358696 A1 Nov. 10, 2022

(51) Int. Cl.
*G06T 11/20* (2006.01)
*B64D 43/00* (2006.01)
*G06F 3/04842* (2022.01)

(52) U.S. Cl.
CPC ............ *G06T 11/206* (2013.01); *B64D 43/00* (2013.01); *G06F 3/04842* (2013.01)

(58) Field of Classification Search
None
See application file for complete search history.

(56) References Cited

U.S. PATENT DOCUMENTS

| | | |
|---|---|---|
| 5,129,221 A | 7/1992 | Walker et al. |
| 5,555,175 A | 9/1996 | D'orso |
| 8,285,427 B2 | 10/2012 | Rogers et al. |
| 8,321,069 B2 | 11/2012 | Vasek et al. |
| 8,403,258 B2 | 3/2013 | Arendt et al. |

(Continued)

FOREIGN PATENT DOCUMENTS

| | | |
|---|---|---|
| EP | 1369665 A2 | 12/2003 |
| FR | 3101470 A1 | 4/2021 |
| WO | 2007001366 A2 | 1/2007 |

OTHER PUBLICATIONS

Ackerman et al.; "Automation Situation Awareness Display fora Flight Envelope Protection System;" Journal of Guidance, Control, and Dynamics; vol. 40, No. 4, Apr. 2017 (Year: 2017).*

(Continued)

*Primary Examiner* — Edward Martello
(74) *Attorney, Agent, or Firm* — Lorenz & Kopf, LLP (57) ABSTRACT

Methods and systems are provided for displaying visualizations of a vehicle's capability with respect to an input query corresponding to a prospective action to modify operation of the vehicle. One method involves identifying one or more input query parameters, obtaining current status information for the vehicle, identifying one or more performance constraints for the vehicle, and determining a capability envelope for the vehicle for satisfying the one or more input query parameters for the prospective action based at least in part on the current status information and the one or more performance constraints. The capability envelope includes a plurality of potential trajectories for the vehicle different from a reference trajectory for the vehicle. The method provides graphical indicia of the one or more input query parameters and the capability envelope with respect to the reference trajectory on a navigational map display.

20 Claims, 4 Drawing Sheets

(56) References Cited

U.S. PATENT DOCUMENTS

| | | | |
|---|---|---|---|
| 8,417,397 B2* | 4/2013 | Khatwa | G08G 5/0078 701/14 |
| 9,020,681 B2 | 4/2015 | Krupansky et al. | |
| 9,045,018 B2 | 6/2015 | Swanson | |
| 9,567,099 B2 | 2/2017 | Poux et al. | |
| 9,858,824 B1 | 1/2018 | Zogg et al. | |
| 10,139,246 B1 | 11/2018 | Reddy et al. | |
| 10,360,802 B2 | 7/2019 | D'Silva et al. | |
| 10,803,755 B2 | 10/2020 | Puentes et al. | |
| 10,866,592 B2 | 12/2020 | Roger et al. | |
| 2011/0118908 A1 | 5/2011 | Boorman et al. | |
| 2013/0085672 A1* | 4/2013 | Stewart | G08G 5/003 701/528 |
| 2013/0218374 A1 | 8/2013 | Lacko et al. | |
| 2016/0356280 A1 | 12/2016 | Pascu et al. | |
| 2017/0018192 A1 | 1/2017 | Borgyos | |
| 2017/0018196 A1 | 1/2017 | Shay | |
| 2017/0168658 A1* | 6/2017 | Lacko | G06F 3/0481 |
| 2017/0243495 A1 | 8/2017 | Moravek et al. | |
| 2017/0249849 A1 | 8/2017 | De Prins et al. | |
| 2020/0168103 A1 | 5/2020 | Holder et al. | |
| 2021/0018333 A1 | 1/2021 | Ramachandra et al. | |

OTHER PUBLICATIONS

Ackerman et al.; "Flight Envelope Information-Augmented Display for Enhanced Pilot Situation Awareness;" AIAA SciTech Forum; Jan. 5-9, 2015, Kissimmee, Florida; Published by the American Institute of Aeronautics and Astronautics, Inc (Year: 2015).*

Tang et al.; "Methodologies for Adaptive Flight Envelope Estimation and Protection;" AIAA Guidance, Navigation, and Control Conference; Aug. 10-13, 2009, Chicago, Illinois (Year: 2009).*

Zachos, P.K.; Gas Turbine Sub-idle Performance Modelling; Altitude Relight and Windmilling; School of Engineering Department of Power and Propulsion; Feb. 2010.

* cited by examiner

CAPABILITY ENVELOPE DISPLAY METHODS AND SYSTEMS

TECHNICAL FIELD

The subject matter described herein relates generally to vehicle systems, and more particularly, embodiments of the subject matter relate to aircraft systems and related cockpit displays for depicting potential aircraft capability.

BACKGROUND

Aircraft and other vehicles often operate in controlled area where the pilot or vehicle operator is expected to coordinate operation with a controller or other authority for traffic management, safety, efficiency, etc. For example, an air traffic controller (ATC) typically communicates an instruction or a request for pilot action by a particular aircraft within a controlled airspace managed by that ATC. Thereafter, the pilot is responsible for acknowledging the request and confirming performance of the pilot action. However, to ascertain the potential operational impacts of the proposed pilot action and/or the availability of the aircraft to safely execute the requested action, the pilot is required to manually obtain information from various instrument displays and mentally synthesize or assess the information using the pilot's personal experience and judgment. This can be time consuming, inefficient, error prone, and potentially distracting, and ultimately result in a lack of situational awareness with respect to the proposed course of action. Accordingly, it is desirable to improve situational awareness with respect to instructions or requests received in connection with operation in a controlled area. Other desirable features and characteristics will become apparent from the subsequent detailed description and the appended claims, taken in conjunction with the accompanying drawings and this background.

BRIEF SUMMARY

Methods and systems are provided for displaying visualizations of the capability of a vehicle, such as an aircraft, with respect to an input query corresponding to a prospective action to modify operation of the vehicle. One or more input query parameters for the prospective action are identified or otherwise received via a user input device or based on analysis of communications intended for the vehicle (e.g., air traffic control (ATC) audio communications). One exemplary method involves obtaining current status information for the vehicle, identifying one or more performance constraints for the vehicle, and determining a capability envelope for the vehicle for satisfying the one or more input query parameters for the prospective action based at least in part on the current status information and the one or more performance constraints. The capability envelope comprises a plurality of potential trajectories for the vehicle that are different from a reference trajectory for the vehicle (e.g., a planned trajectory according to a flight plan). The method continues by providing a graphical indication of the one or more input query parameters with respect to the reference trajectory for the vehicle on a navigational map on a display device associated with the vehicle and providing one or more graphical indicia of the capability envelope with respect to the reference trajectory for the vehicle on the navigational map.

In another embodiment, an apparatus is provided for a computer-readable medium having computer-executable instructions stored thereon that, when executed by a processing system, cause the processing system to obtain an input query comprising one or more parameters for a prospective action by a vehicle to modify operation of the vehicle, obtain current status information for the vehicle, identify one or more performance constraints for the vehicle, determine a capability envelope for the vehicle for satisfying the one or more parameters for the prospective action based at least in part on the current status information and the one or more performance constraints, provide, on a navigational map on a display device, a graphical indication of the input query with respect to a reference trajectory for the vehicle, and provide, on the navigational map, one or more graphical indicia of the capability envelope with respect to the reference trajectory.

In another embodiment, a system is provided that includes a display device having a navigational map display rendered thereon, one or more systems to provide current status information for a vehicle, and a processing system coupled to the display device and the one or more systems to identify one or more input query parameters for a prospective action by the vehicle to modify operation of the vehicle, identify one or more performance constraints for the vehicle, determine a capability envelope for the vehicle for satisfying the one or more input query parameters for the prospective action based at least in part on the current status information and the one or more performance constraints, provide a graphical indication of the one or more input query parameters with respect to a reference trajectory for the vehicle on the navigational map display, and provide one or more graphical indicia of the capability envelope with respect to the reference trajectory on the navigational map display.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein generally relate to systems and methods that facilitate a pilot or other vehicle operator visualizing vehicle capabilities and potential operational impacts of different vehicle configurations or actions to improve situational awareness and decision making. In this regard, rather than requiring manual analysis and determination of potential operational impacts based on anecdotal experience and instrument displays, the cognitive thought process is emulated and visualized in a manner that provides a more accurate understanding of the potential operational impacts of different actions. This, in turn, helps the pilot or vehicle operator better respond to commands or requests issued by an air traffic controller (ATC) or other traffic manager when operating in a controlled area, as well as choose which vehicle configurations (or sequences thereof) should be utilized to achieve the desired operational objective(s). For example, in contrast to approaches that merely indicate off-nominal situations or deficiencies (e.g., an alert that something cannot be done) and require a mental translation from deficiencies into capabilities which can be subject to time constraints, distraction, human error or other complications or exigencies, the subject matter described herein integrates information from different sources and provides graphical indicia of a capability envelope that indicates the range of potential achievable trajectories and corresponding vehicle configurations for achieving different potential operational objectives (e.g., minimizing travel time, minimizing fuel consumption, minimizing wear, stress or other degradation of the vehicle condition, maximizing safety, maximizing comfort, and/or the like). Although the subject matter is described herein primarily in an aviation context and potentially with reference to a flight plan, an aircraft procedure, a taxi route, or the like, it should be understood that the subject matter may be similarly utilized in other applications involving a predefined route for travel (e.g., a travel plan or travel route) or with another vehicle (e.g., automobiles, marine vessels, trains), and the subject matter described herein is not intended to be limited to use with aircraft or in an aviation environment.

As described in greater detail below, in exemplary embodiments, a capability envelope for an aircraft is determined that provides indication of whether and/or how the aircraft may be operated to achieve or otherwise satisfy one or more input query parameters for a prospective action by the aircraft to modify operation of the aircraft. For example, ATC may request a pilot to execute a specific climb or descent profile. Rather than requiring the pilot manually assess feasibility of the request (e.g., by identifying the current aircraft gross weight, environmental factors and the like using onboard instruments and/or displays and mentally integrating the manually gathered information to develop a mental model of the proposed course of action), a capability envelope for satisfying one or more input query parameters associated with the prospective action proposed by the ATC is determined using information pertaining to the current status of the aircraft (e.g., the current speed, heading, altitude, drag configuration, gross weight, meteorological conditions, terrain and/or obstacles, traffic, etc.) and one or more performance constraints for the aircraft (e.g., a maximum vertical speed limit, a maximum pitch angle, drag configuration constraints, passenger or ride comfort settings, and/or the like). One or more graphical indicia of the capability envelope are provided with respect to graphical indicia of a reference trajectory (e.g., a planned trajectory currently being flown according to a flight plan) are provided on a navigational map to convey, to the pilot, the range of potential aircraft capabilities with respect to the input query parameter(s) when deviating from the reference trajectory.

In exemplary embodiments, the capability envelope includes or encompasses various different potential trajectories that could be flown by the aircraft using different configurations (or sequences thereof) to deviate from the reference trajectory in order to satisfy one or more parameter(s) associated with the prospective action or otherwise comply with the request. In some implementations, the capability envelope is bounded by trajectory extrema that are constrained or otherwise limited by the current operating status for the aircraft or the performance constraints of the aircraft. For example, the capability envelope may convey the different potential trajectories or operating scenarios between boundary trajectories that minimize and/or maximize one or more aspects of aircraft operation (e.g., fuel burn, cost, arrival time, travel time to the next waypoint or navigational reference point of interest, descent rate, climb rate, and/or the like). Thus, the pilot may quickly ascertain how a proposed course of action relates to the capability limits of the aircraft given the current status and meteorological conditions, and based on that understanding, better decide how to proceed with operating the aircraft and/or how to respond to an ATC request with improved situational awareness. For example, if satisfying one or more input query parameters for the proposed course of action appears to require a more extreme trajectory than desired (e.g., too much fuel burn, delayed arrival time, passenger discomfort, etc.), the pilot may communicate with the ATC to modify or alter the request to better comport with the current operating status and provide greater margin with respect to the aircraft's capability.

By virtue of the subject matter described herein, the time required for a pilot to ascertain whether they are able to take a proposed course of action, respond to the ATC, co-pilot, or other individual making the request, and initiate or request modification to the proposed course of action may be reduced. Safety is also improved by providing the pilot with better awareness of the amount of time required to execute the proposed course of action and how close the prospective operation of the aircraft will come to the capability limits of the aircraft, which reduces the likelihood of cognitive shortcuts, inaccurate assessments, or other mental errors (e.g., accepting an ATC clearance that exceeds aircraft capabilities).

It should be noted that in addition to analyzing ATC requests, the subject matter described herein may be utilized independent of ATC requests or other external requests or commands. For example, a pilot considering whether to modify or alter future operation of the aircraft at his or her own volition may manually input one or more query parameters that the pilot would like to satisfy (e.g., a particular speed and/or altitude at a particular waypoint, a particular arrival time at a particular waypoint, a particular amount of fuel remaining at a particular waypoint, and/or the like), with a corresponding capability envelope corresponding to different potential trajectories and/or aircraft configurations available for satisfying the query parameters input by the pilot given the current operating status of the aircraft. In this regard, the capability envelope effectively conveys the potential degrees of freedom in terms of modifying the aircraft trajectory or configuration to achieve a desired operational objective.

Figure 1:
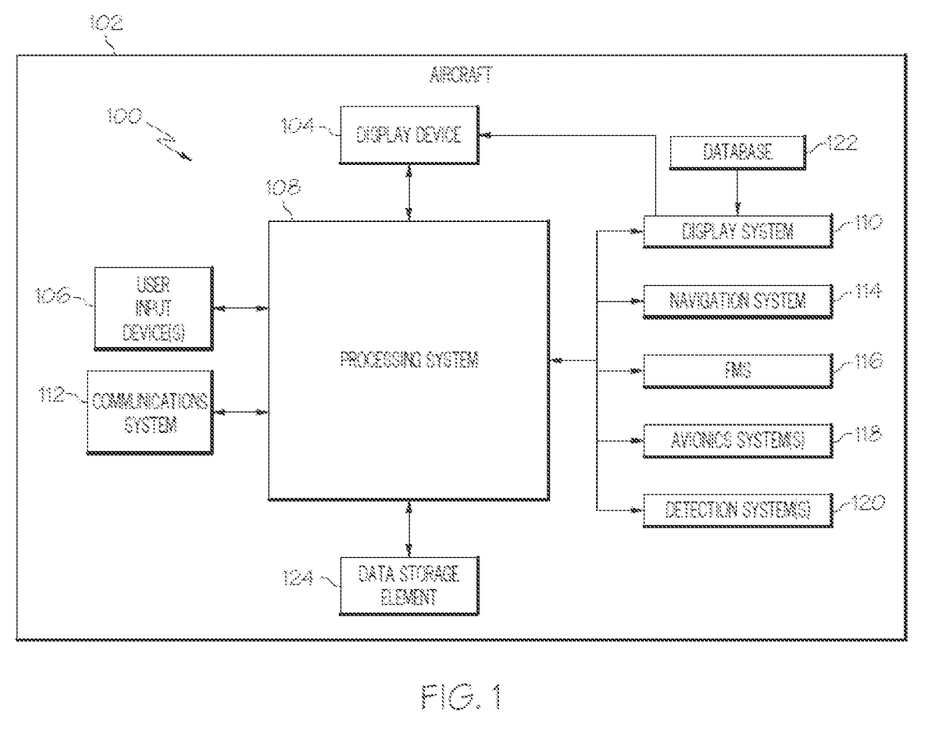
FIG. 1 is a block diagram of a system for an aircraft in an exemplary embodiment.

FIG. 1 depicts an exemplary embodiment of a system 100 which may be located onboard a vehicle, such as an aircraft 102, and configurable to support the input query capability envelope displays and related tasks, functions, operations and/or processes described herein. The system 100 includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below. In various embodiments, the display device 104 may be realized as a multifunction control display unit (MCDU), cockpit display device (CDU), primary flight display (PFD), navigation display, or any other suitable multifunction monitor or display suitable for displaying various symbols and information described herein. The display device 104 may be configured to support multi-colored or monochrome imagery, and could include or otherwise be realized using a liquid crystal display (LCD), a light emitting diode (LED) display, an organic light emitting diode (OLED) display, a heads-up display (HUD), a heads-down display (HDD), a plasma display, a projection display, a cathode ray tube (CRT) display, or the like.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

In exemplary embodiments, the user input device 106 is realized as a tactile user input device capable of receiving free-form user input via a finger, stylus, pen, or the like. Tactile user input may be received or detected using an array of sensors that are configured to detect contact or proximity to a surface using any number of different technologies (e.g., resistive, capacitive, magnetic, acoustic, optical, infrared and/or the like) which are not germane to this disclosure. In exemplary embodiments, the tactile user input device 106 is integrated with an instance of a display device 104 to provide a touchscreen, that is, an array of sensors arranged adjacent or proximate to an electronic display that are configured to detect contact to the surface of the display and generate corresponding output signals indicative of coordinate locations on the display that were touched or otherwise contacted by a user.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, vertical profile displays or vertical situation displays, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102, as described in greater detail below.

As described in greater detail below, in one or more exemplary embodiments, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in some embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in one or more exemplary embodiments, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in one or more exemplary embodiments, the navigation system 114 includes inertial reference sensors capable of obtaining or otherwise determining the attitude or orientation (e.g., the pitch, roll, and yaw, heading) of the aircraft 102 relative to Earth.

In one or more exemplary embodiments, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historical meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag (EFB) that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
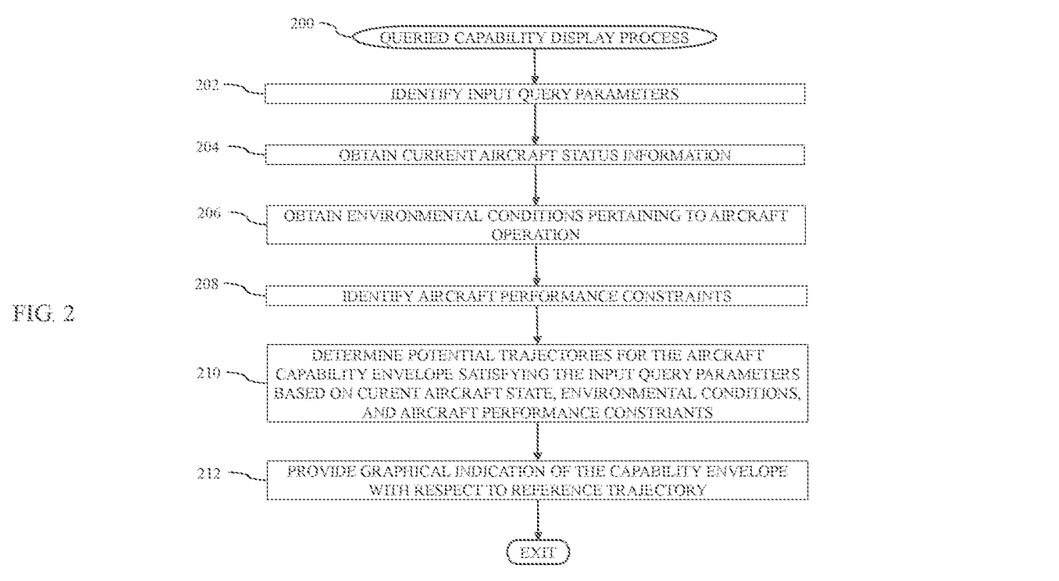
FIG. 2 is a flow diagram of a queried capability display process suitable for implementation by the aircraft system of FIG. 1 in one or more exemplary embodiments.

FIG. 2 depicts an exemplary embodiment of a queried capability display process 200 suitable for implementation by an aircraft system or display system to provide graphical indicia of a capability envelope with respect to one or more input query parameters. The various tasks performed in connection with the illustrated process may be implemented using hardware, firmware, software executed by processing circuitry, or any combination thereof. In practice, portions of the queried capability display process 200 may be performed by different elements of the aircraft system 100, such as, for example, the display device 104, the user input device 106, the processing system 108 and/or one or more onboard avionics systems 110, 112, 114, 116, 118, 120. It should be appreciated that the queried capability display process 200 may include any number of additional or alternative tasks, the tasks need not be performed in the illustrated order and/or the tasks may be performed concurrently, and/or the tactile input resolution process may be incorporated into a more comprehensive procedure or process having additional functionality not described in detail herein. Moreover, one or more of the tasks shown and described in the context of FIG. 2 could be omitted from a practical embodiment of the queried capability display process 200 as long as the intended overall functionality remains intact.

The queried capability display process 200 initializes by receiving or otherwise obtaining input values for one or more query parameters for generating a corresponding capability envelope (task 202). In some embodiments, a pilot or other user utilizes a user input device 106 to indicate a desire to initiate the queried capability display process 200 (e.g., by selecting a button or similar graphical user interface (GUI) element associated with the capability query functionality on a GUI display presented on the display device 104), which, in turn, results in the processing system 108 generating one or more combo boxes, text boxes, list boxes, drop-down menus, radio buttons or other GUI elements that allow the user to identify what parameters are to be utilized for a capability query (e.g., speed, altitude, a waypoint or other navigational reference point or geographic location, fuel burn, arrival time, etc.) along with the desired values (or range thereof) for the selected parameters to be satisfied by the aircraft 102. In this regard, depending on the embodiment, the value(s) for the input query parameter(s) may be fixed or variable within a range defined by the user. In other embodiments, the desired values for the input query parameters may be automatically identified based on analysis of communications obtained via a communications system 112 (e.g., audio communications from ATC, data link communications, and/or the like). For example, as described in U.S. patent application Ser. No. 15/982,518, ATC communications received via the communications system 112 may be transcribed into corresponding textual representations, which, in turn, may be analyzed to identify and extract one or more operational subjects, operational parameters values, and/or aircraft actions associated with the aircraft 102. In this regard, the parameter values associated with an ATC command or request may automatically be identified by the queried capability display process 200 as the input parameter values for generating a capability envelope corresponding to the ATC communication.

After obtaining the input query parameter values defining the capability query to be performed, the queried capability display process 200 identifies or otherwise obtains current status information characterizing the current operating state of the aircraft (task 204). In this regard, the current status information generally represents the instantaneous, real-time or most recent available values for one or more parameters that quantify the current operation of the aircraft 102. For example, the processing system 108 may obtain (e.g., from FMS 116, navigation system 114 and/or other avionic systems 118) one or more of the following: the current location of the aircraft 102, the current altitude (or above ground level) of the aircraft 102, the current heading (or bearing) of the aircraft 102, the current amount of fuel remaining onboard the aircraft 102, the current engine status, the current aircraft configuration (e.g., the current flap configuration, the current landing gear configuration, and/or the like). Thus, the current values for the different operational state parameters define the current operating state of the aircraft 102.

The queried capability display process 200 also identifies or otherwise obtains information characterizing the current and/or future operating environment for the aircraft (task 206). For example, the processing system 108 may obtain, either from the onboard detection systems 120 or an external system via communications system 112, current meteorological conditions at or near the current location of the aircraft 102 (e.g., the current temperature, wind speed, wind direction, atmospheric pressure, turbulence, and the like). In various embodiments, the queried capability display process 200 also identifies or otherwise obtains forecasted or real-time meteorological information associated navigational reference points or geographic areas relevant to the upcoming trajectory of the aircraft (e.g., the upcoming waypoints of the flight plan). Similarly, the processing system 108 may also obtain information characterizing air traffic, terrain, and/or other obstacles in the vicinity of the current location of the aircraft 102 or the upcoming trajectory of the aircraft 102 from one or more onboard systems 120 (e.g., a Traffic Alert and Collision Avoidance System (TCAS), a Terrain Awareness and Warning System (TAWS), and/or the like), in addition to the terrain or obstacle data that may be available from an onboard database (e.g., database 122).

Still referring to FIG. 2, the queried capability display process 200 identifies or otherwise obtains one or more performance constraints for the aircraft and then calculates or otherwise determines the potential trajectories defining the capability envelope for satisfying the input query parameters based on the current operating status and environmental conditions using the performance constraints (tasks 208, 210). The performance constraints define boundary conditions for operating the aircraft 102 that limit the capability of the aircraft 102 to achieve more extreme operations, such as, for example, a maximum vertical speed, a maximum pitch angle, a maximum roll rate, a maximum deceleration rate, a maximum acceleration rate, a minimum and/or maximum speed for a particular aircraft configuration or configuration change, a maximum angle of attack, a maximum engine thrust, a minimum and/or maximum autopilot or autothrottle engagement, a cost index, allowable lateral and/or vertical modes, and/or the like. In this regard, in some embodiments, the performance constraints may be defined by an aircraft manufacturer, an airline or aircraft operator, a standards organization or other regulatory body, and/or the like, and the performance constraints may vary depending on the current aircraft state (e.g., the maximum pitch angle or roll rate may vary depending on the aircraft drag configuration, etc.). Additionally, in some embodiments, the performance constraints may also include user-configurable values for different ride control settings or passenger comfort settings (e.g., a maximum acceleration or g-force), which may be more limiting in some respects than performance constraints dictated by an aircraft manufacturer, an airline, or the like. Some implementations may also support contextual performance constraints based on real-time meteorological data (e.g., to avoid turbulence, convection, or other meteorological conditions).

To determine the capability envelope, the queried capability display process 200 constructs different potential trajectories for traveling from the current aircraft state to a desired destination (e.g., a destination airport, a destination waypoint, and or the like) that satisfy the input query parameters without violating any of the aircraft performance constraints. In this regard, the values for the input query parameters may be treated as fixed variables or variable ranges that constrain a future state of the aircraft 102 with respect to at least one of a lateral trajectory, a vertical trajectory, and a speed profile for the aircraft 102. Thereafter, the processing system 108 constructs different combinations of trajectories and corresponding speed profiles that are configured to satisfy the input query parameters at a future state while en route to the destination for the aircraft 102. In this regard, the different combinations of trajectories and corresponding speed profiles may be configured to vary or optimize different aspects of the prospective operation of the aircraft 102, for example, minimizing cost, minimizing travel time, minimizing fuel burn, and/or the like. Additionally, different trajectory and speed profile combinations may be constructed that achieve one or more performance constraints associated with the aircraft 102 to identify potential boundaries for the aircraft operation.

For example, if the input query specifies a speed target for the aircraft 102 upon traversing a particular waypoint at a particular altitude, different combinations of vertical trajectories and corresponding speed profiles that initiate from the current aircraft speed at the current aircraft altitude and location and satisfy the speed target at the upcoming waypoint at that particular altitude by varying other variables associated with operating the aircraft (e.g., engine status or thrust configuration, drag configuration, flight path angle, and/or the like). In exemplary embodiments, the potential trajectories and speed profiles are constructed using one or more aerodynamical models that account for the current or initial aircraft operating state (e.g., the current aircraft altitude, speed, configuration, etc.) as well as the meteorological conditions at the current location of the aircraft 102 and/or en route along the respective trajectory. To capture the full range of the capability aircraft, the timing and/or sequencing of the different aircraft configurations or variables associated with the different potential trajectories and speed profiles may be chosen or otherwise optimized based on the performance constraints associated with the aircraft 102. For example, a vertical trajectory and speed profile combination may be constructed for satisfying the speed and altitude targets at the upcoming waypoint that maximizes the vertical speed up to (but not exceeding) the maximum vertical speed constraint for the aircraft 102. One or more other vertical trajectory and speed profile combinations may be constructed for satisfying the speed and altitude targets at the upcoming waypoint while optimizing one or more aspects of aircraft operation (e.g., minimizing cost, minimizing travel time, minimizing fuel burn, and/or the like) without violating any performance constraints. Thus, the queried capability display process 200 results in multiple different combinations of trajectories and corresponding speed profiles for achieving or satisfying the input query parameters that are capable of being flown by the aircraft 102 without violating the performance constraints.

Still referring to FIG. 2, after determining different potential trajectories for satisfying the input query parameters, the queried capability display process 200 outputs, generates or otherwise provides graphical indication of the capability envelope with respect to a reference trajectory for the aircraft on a navigational map (task 212). For example, the queried capability display process 200 may provide graphical indicia of the input query along with graphical representations of the different potential trajectories for deviating from the reference trajectory defined by the flight plan on a navigational map with respect to a graphical representation of the reference trajectory, thereby conveying to the pilot the range of the aircraft's capability and different potential deviations for satisfying the input query parameters relative to a planned reference trajectory currently being flown. In this regard, if the navigational map is realized as a vertical profile display or a perspective view display, the queried capability display process 200 may provide a graphical representation of the potential vertical trajectory that climbs or descends the fastest relative to the reference vertical trajectory defined by the flight plan along with a graphical representation of the potential trajectory that climbs or descends the slowest relative to the reference vertical trajectory to convey the range or boundaries of the potential aircraft capability for satisfying the input query parameters in a vertical dimension. That said, it should be appreciated the subject matter is not limited to any particular number, type or combination of potential trajectories to be depicted in connection with graphically representing the capability envelope. In exemplary embodiments, the queried capability display process 200 also provides graphical indicia of the different aircraft configurations (or sequences thereof) associated with the depicted trajectories for deviating from the reference trajectory. In some embodiments, the queried capability display process 200 may also provide indicia of a performance constraint that defines a depicted trajectory (e.g., that the trajectory corresponds to the maximum vertical speed, or the like) or other criteria utilized to construct the depicted trajectory (e.g., that the trajectory corresponds to the minimum cost, the minimum fuel burn, and/or the like).

Figure 3:
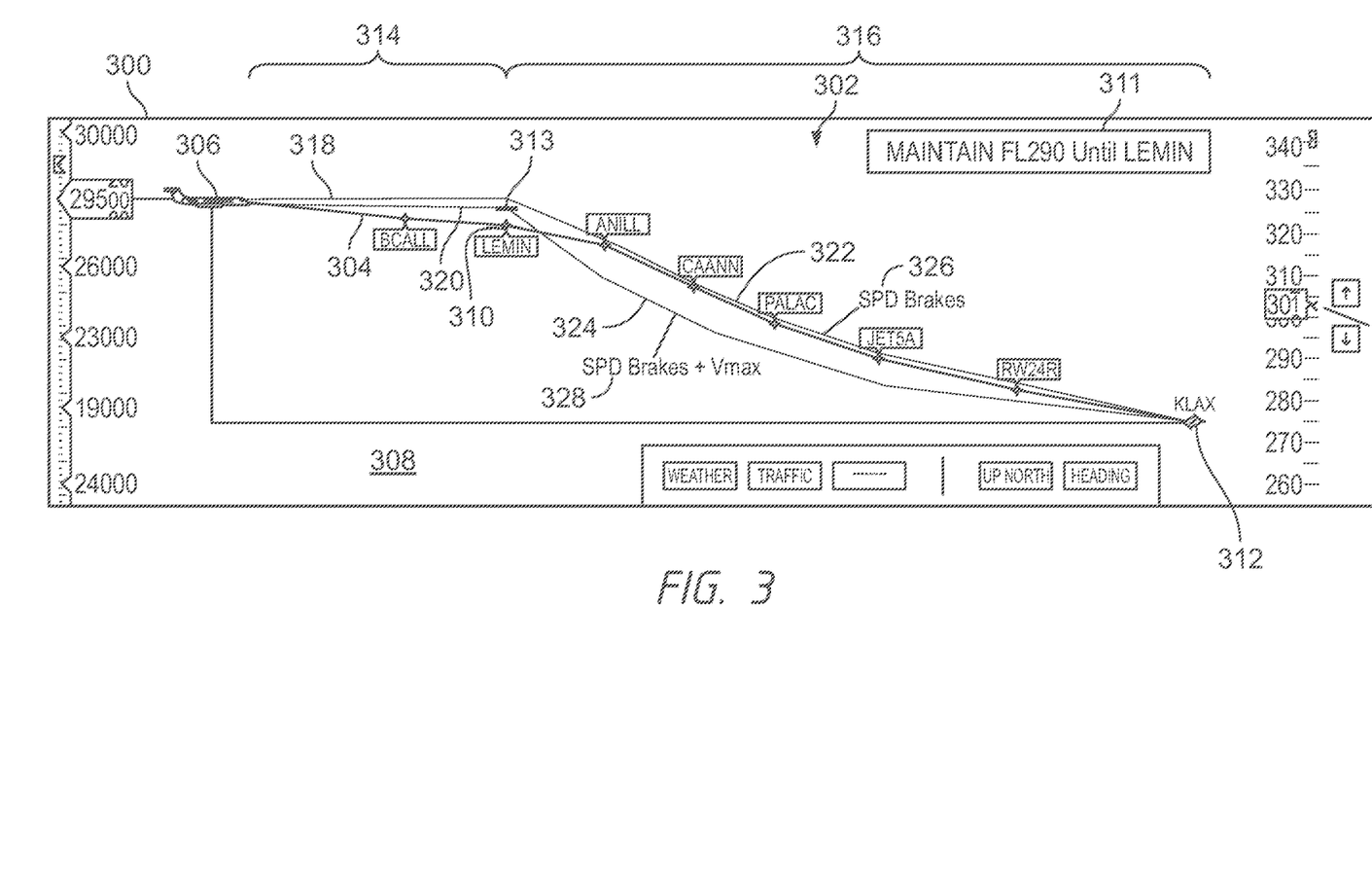
FIGS. 3-4 depict exemplary capability query graphical user interface (GUI) displays suitable for presentation on a display device onboard the aircraft in the system of FIG. 1 in connection with the queried capability display process of FIG. 2 in accordance with one or more embodiments.

FIG. 3 depicts an exemplary capability query graphical user interface (GUI) display 300 that may be displayed, rendered, or otherwise presented by the processing system 108 and/or display system 110 as a flight deck display on a display device 104 onboard an aircraft 102 in conjunction with the queried capability display process 200 of FIG. 2 when the aircraft is in an approach or descent flight phase. The capability query GUI display 300 includes a navigational map display 302 including a graphical representation 304 of a portion of route defined by a flight plan that is ahead of the aircraft or is otherwise yet to be flown by the aircraft. For example, a graphical representation 306 of the aircraft may be disposed at or near a left edge of the navigational map display 302 at a vertical position that corresponds to the current altitude of the aircraft, with the graphical representation of the flight plan trajectory 304 extending from the aircraft symbology 306 along the left edge of the vertical profile display towards the right of the navigational map display 302 to depict the planned altitude for the aircraft at future navigational reference points or geographic locations along the flight plan with respect to the current aircraft position. Although FIG. 3 depicts a three-dimensional or two-and-a-half dimensional view of the navigational map 302 that conveys both lateral position (e.g., geographic coordinate locations) as well as vertical position or altitude, in practice, alternative embodiments may utilize various two-dimensional views (e.g., a lateral map or lateral view of the aircraft from a top-down perspective, a vertical profile display or vertical situation display from a side view or lateral perspective, and/or the like) or other perspective views, such as, for example, forward-looking perspective views, synthetic vision displays, large format displays, or any other sort of three-dimensional, angular or skewed view or projection of the current physical relationship of the aircraft with respect to the Earth.

In one or more embodiments, the navigational map display 302 includes a background 308 including a graphical representation of the terrain underlying the aircraft symbology 306 and the upcoming portion of the flight plan route 304. Depending on the embodiment, the background 308 may include a graphical representation of the terrain, topology, navigational reference points, airspace designations and/or restrictions, or other suitable items or points of interest corresponding to the currently displayed area of the navigational map 302, which may be maintained in a terrain database, a navigational database, a geopolitical database, or another suitable database. For example, the display system 110 may render a graphical representation of navigational aids (e.g., VORs, VORTACs, DMEs, and the like) and airports within the currently displayed geographic area of the navigational map 302 overlying the background 308. Some embodiments of navigational map 302 may also include graphical representations of airspace designations and/or airspace restrictions, cities, towns, roads, railroads, and other geo-political information. In one or more exemplary embodiments, the navigational map 302 is associated with the movement of the aircraft 102, and the aircraft symbology 306 and/or background 308 refreshes or otherwise updates as the aircraft 102 travels, such that the graphical representation of the aircraft 306 is positioned over the terrain background 308 in a manner that accurately reflects the current (e.g., instantaneous or substantially real-time) real-world positioning of the aircraft 102 relative to the Earth. In some embodiments, the aircraft symbology 306 is shown as traveling across the navigational map 302 (e.g., by updating the location of the aircraft symbology 306 with respect to the background 308), while in other embodiments, the aircraft symbology 306 may be located at a fixed position on the navigational map 302 (e.g., by updating the background 308 with respect to the aircraft symbology 306 such that the map 302 is maintained centered on and/or aligned with the aircraft symbology 306). Additionally, depending on the embodiment, the navigational map 302 may be oriented in a cardinal direction (e.g., oriented north-up so that moving upward on the map 302 corresponds to traveling northward), or alternatively, the orientation of the navigational map 302 may be aligned such that the aircraft symbology 306 is always traveling in the same direction and the background 308 adjusted accordingly (e.g., track-up or heading-up).

FIG. 3 depicts the capability query GUI display 300 corresponding to an input query for the aircraft maintaining a flight level of at least 290 (or an altitude of at least 29,000 feet) until reaching the LEMIN waypoint 310. For example, the ATC may issue a request to hold the aircraft high and delay the descent in route to the destination airport 312 (KLAX). In response, the queried capability display process 200 may obtain the input query parameter value of "altitude>=29,000" associated with the LEMIN waypoint, either automatically by analyzing the ATC communications or in response to the pilot (or co-pilot) manually entering in the input query parameters after receiving the ATC request (e.g., task 202). In one or more embodiments, a graphical representation 311 of the input query parameters is provided on the capability query GUI display 300, along with a graphical indication 313 of the input query with respect to the reference trajectory 304 on the navigational map 302, for example, by displaying a marker or other graphical element on the navigational map 302 at a vertical position corresponding to an altitude of 29,000 feet and a horizontal or lateral position corresponding to the geographical coordinates associated with the LEMIN waypoint.

After obtaining the input query, the queried capability display process 200 identifies or otherwise obtains current altitude of the aircraft (e.g., 29,500 ft), the current geographic location of the aircraft 102, the current heading (or bearing) of the aircraft 102, the current amount of fuel remaining onboard the aircraft 102, the current engine status, the current aircraft configuration, and the like (e.g., task 204), while also obtaining meteorological information or other environmental information pertaining the current location and/or altitude of the aircraft 102, the destination airport 312 and/or the upcoming portion of the flight plan 304 en route to the destination airport 312 (e.g., task 206).

After obtaining the input query parameters and the information characterizing the current operating state of the aircraft 102, the queried capability display process 200 utilizes performance constraints for the aircraft 102 to construct different trajectories between the current altitude of the aircraft 102, 306 of 29,500 feet at the current location of the aircraft and the destination airport 312 that satisfy the input query parameter value of an altitude of 29,000 feet at the LEMIN waypoint 310 that define the capability envelope for satisfying the at or above 29,000 feet altitude constraint at the LEMIN waypoint 310 (e.g., task 208, 210). In one or more embodiments, using the lateral trajectory defined by the waypoints of the flight plan 304, different potential vertical trajectories and corresponding speed profiles for the aircraft 102, 306 may be constructed for the different portions 314, 316 of the flight plan 304 before and after the LEMIN waypoint 310 corresponding to the input query parameter constraint.

For example, different combinations vertical trajectories and corresponding speed profiles may be constructed backwards from the LEMIN waypoint 310 to the current location of the aircraft 102, 306 at the current altitude of the aircraft 102, 306 to define the range of potential capability for the aircraft 102, 306 upon traversing the LEMIN waypoint 310. In one embodiment, for the initial portion 314 of the flight plan in advance of the input query constraint, the queried capability display process 200 determines a potential vertical trajectory that maximizes the descent of the aircraft 102, 306 by constructing the trajectory backwards from an altitude of 29,000 feet at the LEMIN waypoint 310 to the current aircraft altitude of 29,500 feet at the current aircraft location by varying the aircraft configuration and accounting for the current meteorological conditions and aircraft performance constraints to arrive at the current aircraft configuration and current aircraft state at the current aircraft location. Another potential vertical trajectory that minimizes the descent of the aircraft 102, 306 may also be determined by maintaining the current aircraft altitude throughout the initial portion 314 of the flight plan en route to the input query constraint and constructing the vertical trajectory backwards from an altitude of 29,500 feet at the LEMIN waypoint 310 to the current aircraft altitude of 29,500 feet at the current aircraft location using the current aircraft configuration and current meteorological conditions at the aircraft location. The graphical indicia of the capability envelope for the input query (e.g., task 212) includes a graphical representation of the potential trajectory 318 that minimizes descent en route to the constraint along with a graphical representation of the potential trajectory 320 that maximizes descent en route to the constraint, thereby conveying to the pilot the range of potential operation for compliance with the ATC request relative to the corresponding initial portion of the flight plan 304 that is concurrently depicted on the navigational map 302. Additionally, when one of the trajectories 318, 320 requires a change in aircraft configuration (e.g., increased thrust, increased drag, etc.), corresponding graphical indicia of the aircraft configuration changes may be provided in connection with the graphical representation of the respective trajectory 318, 320.

In a similar manner, different combinations vertical trajectories and corresponding speed profiles may be constructed backwards from the destination airport 312 to the LEMIN waypoint 310 to define the range of potential capability for the aircraft 102, 306 after satisfying the input query constraint. For example, for the subsequent portion 316 of the flight plan following the LEMIN waypoint 310, the queried capability display process 200 determines a potential vertical trajectory that maximizes the descent of the aircraft 102, 306 by constructing the trajectory backwards from the destination airport 312 to the minimum altitude of 29,000 feet at the LEMIN waypoint 310 based on the maximum descent rate or maximum vertical speed of the aircraft, the user-configurable ride comfort settings, and/or other performance constraints that may limit the descent of the aircraft 102, 306 (e.g., allowable drag configuration change speeds) while accounting for the expected configuration of the aircraft 102, 306 at the LEMIN waypoint 310 and the current and/or forecasted meteorological conditions for the subsequent portion 316 of the flight plan. In some embodiments, the maximum descent trajectory may also be optimized to minimize and/or maximize travel time, cost, fuel burn, or some other aspect of aircraft operation while maintaining compliance with applicable performance constraints. Additionally, the maximum descent trajectory may be configured to satisfy any number of different stabilization criteria or other energy management criteria associated with an approach to the destination airport 312, such as one or more of the stabilization criteria described in U.S. Patent Publication No. 2013/0218374.

Another potential vertical trajectory that minimizes the descent of the aircraft 102, 306 may also be determined by constructing the trajectory backwards from the destination airport 312 to the maximum altitude of 29,500 feet at the LEMIN waypoint 310 defined by the minimum descent trajectory 318 en route to the LEMIN waypoint 310. As described above, the minimum descent trajectory for the subsequent portion 316 may similarly account for the expected configuration of the aircraft 102, 306 at the LEMIN waypoint 310 and the current and/or forecasted meteorological conditions for the subsequent portion 316 of the flight plan while also satisfying the applicable performance constraints for the aircraft, stabilization and/or energy management criteria associated with the destination airport 312, and/or the like. The minimum descent trajectory for the subsequent portion 316 may likewise be configured to optimize one or more aspects of aircraft operation in a manner opposite the maximum descent trajectory to provide multidimensional guidance regarding the aircraft capability.

Still referring to FIG. 3, the graphical indicia of the capability envelope for the input query (e.g., task 212) includes a graphical representation of the potential trajectory 322 that minimizes descent from the constrained waypoint 310 to the destination airport 312 along with a graphical representation of the potential trajectory 324 that maximizes descent to the destination airport 312, thereby conveying to the pilot the range of potential operation for compliance with the ATC request relative to the subsequent portion 316 of the flight plan 304 that is concurrently depicted on the navigational map 302. For example, the pilot may quickly ascertain the capability and relative timing for intercepting or recapturing the originally planned trajectory 304 after satisfying the ATC request at the LEMIN waypoint 310, depending on the particular aircraft configuration (or sequence thereof) the pilot prefers or chooses at that subsequent point in time. In this regard, the queried capability display process 200 provides graphical indicia of the corresponding aircraft configurations 326, 328 associated with the different trajectories 322, 324 to provide guidance to the pilot how the aircraft may need to be operated in the future if the pilot accepts the ATC request. Additionally, some embodiments may provide feedback or guidance pertaining to the potential trajectories 318, 320, 322, 324 for the capability envelope relative to the original flight plan trajectory 304. For example, if any combination of potential trajectory 318, 320 before LEMIN waypoint 310 and potential trajectory 322, 324 after the LEMIN waypoint 310 results in a performance penalty or improvement relative to the original flight plan trajectory 304 (e.g., an increased or decreased cost, fuel burn, a delayed arrival time, and/or the like), the capability query GUI display 300 may include graphical indicia of the performance penalty or improve associated with compliance with the ATC request.

Figure 4:
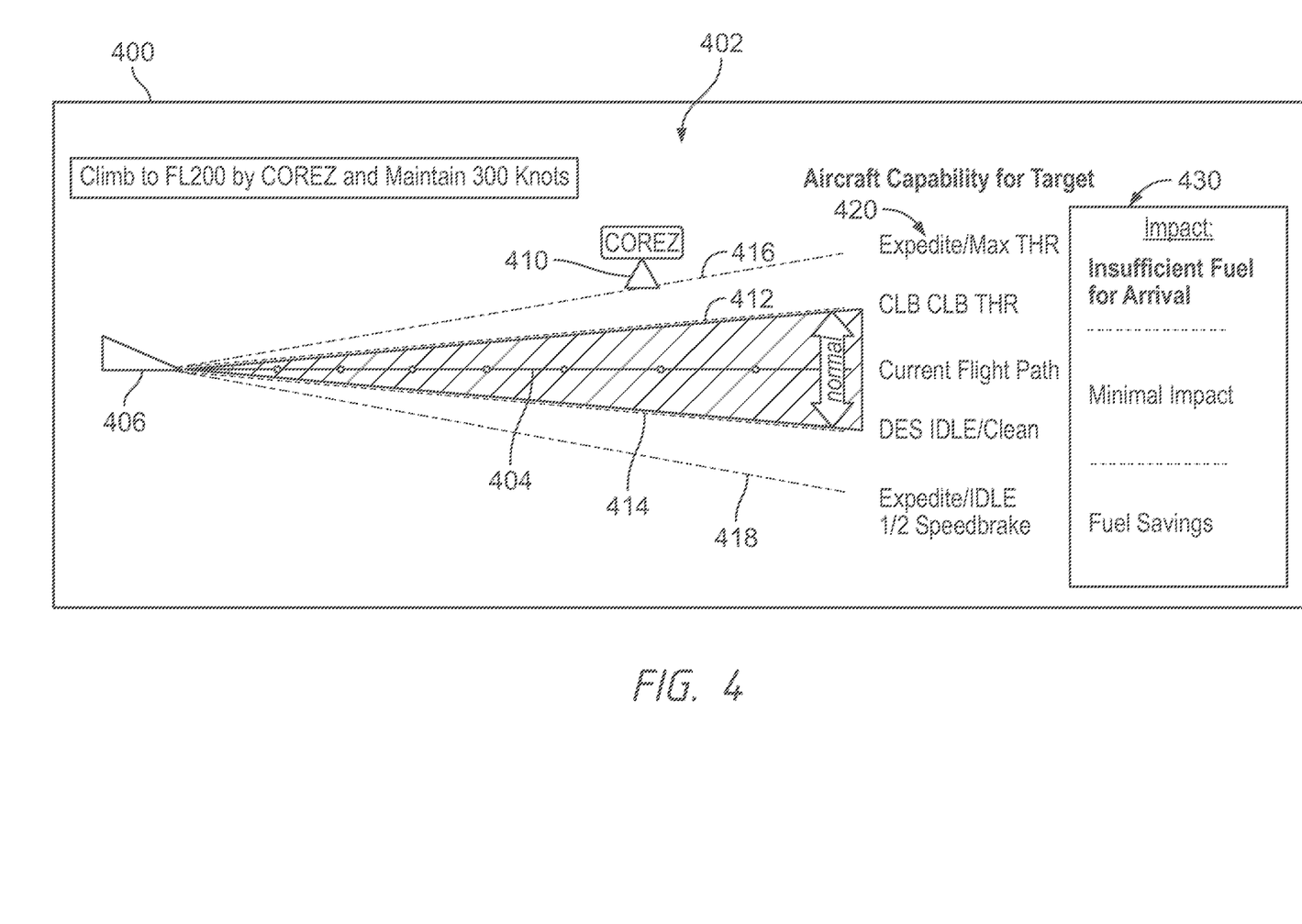

FIG. 4 depicts another embodiment of a capability query GUI display 400 that may be displayed, rendered, or otherwise presented on a display device 104 onboard an aircraft 102 in conjunction with the queried capability display process 200 of FIG. 2. The capability query GUI display 400 includes a navigational map display 402 including a graphical representation 404 of the vertical profile for a portion of route that is ahead of the aircraft or is otherwise yet to be flown by the aircraft. A graphical representation 406 of the aircraft disposed at or near a left edge of the vertical profile navigational map display 402 at a vertical position that corresponds to the current altitude of the aircraft, with the graphical representation of the planned trajectory 404 extending from the aircraft symbology 406 along the left edge of the vertical profile display towards the right of the navigational map display 402 to depict the planned or anticipated altitude for the aircraft at future locations along the route with respect to the current aircraft position.

FIG. 4 depicts the capability query GUI display 400 corresponding to an input query for the aircraft climbing to a particular flight level (e.g., FL300 or 30,000 feet) by an upcoming waypoint 410 while maintaining a certain speed (e.g., 300 knots) when the aircraft is in a cruise flight phase. For example, the ATC may issue a command or request to change the cruising altitude of the aircraft, or the pilot (or co-pilot) may be interested in modifying the cruise altitude (e.g., due to turbulence or other meteorological conditions). After receiving the input query parameters, either via manual entry or automatically via analysis of ATC communications, the queried capability display process 200 automatically generates the capability query GUI display 400 that includes a graphical representation 411 of the input query parameters and a graphical indication of the input query (e.g., by depicting the upcoming waypoint 410 at a vertical position that corresponds to the altitude value specified by the input query).

To generate the graphical indicia of the capability envelope in the embodiment of FIG. 4, the queried capability display process 200 determines multiple different trajectories for the aircraft 102, 406 that achieve or otherwise maintain the aircraft speed above the speed value provided by the input query (e.g., 300 knots) based on the current operating state of the aircraft 102, 406 and the current and/or forecasted environmental conditions while optimizing or varying different aspects operation of the aircraft (e.g., vertical speed, arrival time, cost, fuel consumption and/or the like) within the applicable performance constraints for the aircraft 102, 406. For example, in the illustrated embodiment, the queried capability display process 200 determines a normal operating range capability envelope defined by trajectories 412, 414 that minimize or maximize the vertical speed (or rate of climb or descent) while being constrained by the user-configurable comfort settings for the aircraft 102, 406 (e.g., to minimize passenger discomfort and/or the like). In this regard, the capability query GUI display 400 includes a comfortable climb trajectory 412 that maximizes vertical speed while climbing and maintaining an aircraft speed of 300 knots without violating the passenger comfort vertical speed setting, and a comfortable descent trajectory 418 that maximizes vertical speed while descending and maintaining an aircraft speed of 300 knots without violating the passenger comfort vertical speed setting. In the illustrated embodiment, the queried capability display process 200 also includes an operating range boundary capability envelope defined by trajectories 416, 418 that minimize or maximize the vertical speed without concern for the user-configurable comfort settings and while only being constrained by other performance constraints for the aircraft 102, 406 (e.g., to maximum vertical speed defined by the aircraft manufacturer, and/or the like). In this regard, the capability query GUI display 400 includes a maximum climb trajectory 416 that maximizes vertical speed while climbing and maintaining an aircraft speed of 300 knots and a maximum descent trajectory 418 that maximizes vertical speed while descending and maintaining an aircraft speed of 300 knots.

Still referring to FIG. 4, the capability query GUI display 400 also includes graphical indicia 420 of the different aircraft configurations associated with the graphical representations of the potential trajectories 412, 414, 416, 418 defining the depicted capability envelope, along with graphical indicia 430 of the performance penalty, improvement, or other impact associated with the respective trajectory 412, 414, 416, 418. Additionally, the visual area between trajectories 412, 414 may be shaded or rendered using a visually distinguishable characteristic that is different from the visual area between climb trajectories 412, 416 and the visual area between descent trajectories 414, 418 to allow the pilot to quickly differentiate the normal capability range from within the broader capability range for the aircraft. Furthermore, when the upcoming waypoint 410 depicted at a vertical position that corresponds to the altitude value specified by the input query is not within the capability envelope defined by the boundary trajectories 416, 418, the graphical representation of the waypoint 410 may be rendered using a visually distinguishable characteristic (e.g., a red color) that indicates the aircraft 102, 406 cannot satisfy the input query. On the other hand, in situations when the input query is capable of being satisfied, the graphical indication of the input query provided on the navigational map may be rendered using a different visually distinguishable characteristic (e.g., a green color) to indicate the input query is capable of being satisfied.

By providing graphical indicia of the input query along with the capability envelope that includes trajectories 412, 414 indicating both the normal operating ranges of aircraft capability along with trajectories 416, 418 the extremes of the aircraft's capability, the pilot (or co-pilot) may better assess the feasibility of the proposed action, the relationship between the proposed action and the current or planned trajectory, and the corresponding aircraft configuration changes and performance impacts associated with attempting to satisfy the input query. In this regard, in the case of an ATC request, from the capability query GUI display 400, the pilot may ascertain that the aircraft is incapable of complying with the ATC request because it exceeds the upper boundary of the capability envelope and would compromise the ability of the aircraft to reach the intended destination. Accordingly, rather than accepting an ATC request that the aircraft cannot safely or feasibly execute, the pilot may respond to ATC by denying the request and/or proposing a different course of action that is within the aircraft's capability envelope, for example, by proposing a climb to an altitude at the constraining waypoint 410 that is defined by the comfortable climb trajectory 412 or the comfortable descent trajectory 414.

Referring again to FIGS. 1-2, it should be appreciated the embodiments depicted in FIGS. 3-4 depict simplified representations of potential capability query GUI displays and are not intended to be limiting. For example, practical embodiments may include any number of GUI elements that allow the pilot to modify the input query parameters used to generate the capability envelope, such as, specifying different ranges of values for different input query parameters, characterizing some input query parameters or other variables as fixed while allowing other parameters or variables to vary, selectively applying performance constraints (e.g., user-configurable comfort settings), selecting aspects of aircraft operation to minimize, maximize and/or optimize for the capability envelope (e.g., cost, travel time, fuel consumption, and/or the like). In this regard, the input query parameters may be defined in the form of ranges, which may be bounded (e.g., airspeed between 275 and 290 knots, etc.) or unbounded in one direction (e.g., airspeed greater than or equal to 290 knots, altitude less than or equal to 30,000 feet, etc.), and in some embodiments, the input query parameters may be defined by the current operating state (e.g., maintain the current airspeed, altitude, aircraft configuration, and/or the like). Thus, rather than providing simplified or binary feedback regarding aircraft capability (e.g., yes or no), the subject matter described herein provides a customizable and fulsome view of what the current capabilities of the aircraft are given the current operating state and environmental conditions, which, in turn, allows the pilot to better understand how close a proposed course of action comes to the limits of the aircraft capabilities given the current operating state and environmental conditions. Additionally, when the capability envelope is provided on a navigational map GUI display that includes graphical representations of the current and/or forecasted meteorological conditions relevant to the upcoming operation of the aircraft, the subject matter described herein facilitates the pilot avoiding undesirable meteorological conditions while maintaining operation within the limits of the aircraft capabilities and without compromising other aspects of operation (e.g., fuel, travel time, passenger comfort, etc.).

To briefly summarize, the subject matter described herein solves the problems of pilots or other vehicle operators lacking capability visualizations by providing prescriptive guidance in a query-based manner that reduces workload, reduces decision time and/or response time to address external requests, and improves the quality of decisions. As a result, safety, clearance compliance, trajectory management, operational efficiency and fuel management may be improved. The decision support may be particularly advantageous in single pilot or single user operations where workload and time are at a premium by reducing stress and maintaining operational safety.

For the sake of brevity, conventional techniques related to graphical user interfaces, graphics and image processing, touch sensing, touchscreens, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method comprising:
identifying one or more input query parameters for a prospective action by a vehicle to modify operation of the vehicle;
obtaining current status information for the vehicle;
identifying one or more performance constraints for the vehicle;
determining a capability envelope for the vehicle for satisfying the one or more input query parameters for the prospective action based at least in part on the current status information and the one or more performance constraints, wherein the capability envelope comprises a plurality of potential trajectories for the vehicle different from a reference trajectory for the vehicle;
providing a graphical indication of the one or more input query parameters with respect to the reference trajectory for the vehicle on a navigational map on a display device associated with the vehicle; and
providing one or more graphical indicia of the capability envelope with respect to the reference trajectory for the vehicle on the navigational map.

2. The method of claim 1, wherein providing the one or more graphical indicia of the capability envelope comprises:
- displaying a graphical representation of a first potential trajectory of the plurality of potential trajectories on the navigational map, wherein the first potential trajectory corresponds to a first boundary of a capability range for the vehicle; and
- displaying a graphical representation of a second potential trajectory of the plurality of potential trajectories on the navigational map, wherein the second potential trajectory corresponds to a second boundary of the capability range for the vehicle different from the first boundary.

3. The method of claim 2, further comprising:
- providing a first graphical indication of a first vehicle configuration associated with the first potential trajectory; and
- providing a second graphical indication of a second vehicle configuration associated with the second potential trajectory, wherein the second vehicle configuration is different from the first vehicle configuration.

4. The method of claim 2, further comprising:
- providing a first graphical indication of a first performance impact associated with the first potential trajectory; and
- providing a second graphical indication of a second performance impact associated with the second potential trajectory.

5. The method of claim 2, wherein the first potential trajectory is configured to maximize a performance attribute associated with operating the vehicle and the second potential trajectory is configured to minimize the performance attribute.

6. The method of claim 5, wherein the performance attribute comprises one of cost, fuel consumption and travel time.

7. The method of claim 1, wherein providing the graphical indication of the one or more input query parameters comprises displaying the graphical indication on the navigational map at a position corresponding to an input value for a query parameter.

8. The method of claim 7, wherein:
- the input value for the query parameter comprises an altitude constraint for a waypoint; and
- displaying the graphical indication comprises displaying a graphical representation of the waypoint on the navigational map at a position corresponding to the altitude constraint.

9. The method of claim 1, wherein:
- the vehicle comprises an aircraft;
- the prospective action comprises a deviation from a planned route of travel according to a flight plan;
- identifying the one or more input query parameters comprises automatically identifying the one or more input query parameters based on one or more communications received at the aircraft; and
- the one or more communications include an air traffic control (ATC) request corresponding to the deviation.

10. A computer-readable medium having computer-executable instructions stored thereon that, when executed by a processing system, cause the processing system to:
- obtain an input query comprising one or more parameters for a prospective action by a vehicle to modify operation of the vehicle;
- obtain current status information for the vehicle;
- identify one or more performance constraints for the vehicle;
- determine a capability envelope for the vehicle for satisfying the one or more parameters for the prospective action based at least in part on the current status information and the one or more performance constraints;
- provide, on a navigational map on a display device, a graphical indication of the input query with respect to a reference trajectory for the vehicle; and
- provide, on the navigational map, one or more graphical indicia of the capability envelope with respect to the reference trajectory.

11. The computer-readable medium of claim 10, wherein the computer-executable instructions cause the processing system to determine a plurality of potential trajectories for satisfying the one or more parameters based at least in part on the current status information and the one or more performance constraints by varying a configuration of the vehicle, wherein the capability envelope comprises the plurality of potential trajectories.

12. The computer-readable medium of claim 11, wherein:
- the reference trajectory comprises a planned route of travel;
- the prospective action comprises a deviation from the planned route of travel; and
- the plurality of potential trajectories are different from the reference trajectory.

13. The computer-readable medium of claim 10, wherein the computer-executable instructions cause the processing system to provide the one or more graphical indicia of the capability envelope by:
- displaying a graphical representation of a first potential trajectory on the navigational map, wherein the first potential trajectory corresponds to a first capability boundary for the vehicle; and
- displaying a graphical representation of a second potential trajectory on the navigational map, wherein the second potential trajectory corresponds to a second capability boundary for the vehicle different from the first capability boundary.

14. The computer-readable medium of claim 13, wherein the computer-executable instructions cause the processing system to:
- providing a first graphical indication of a first vehicle configuration associated with the first potential trajectory; and
- providing a second graphical indication of a second vehicle configuration associated with the second potential trajectory, wherein the second vehicle configuration is different from the first vehicle configuration.

15. The computer-readable medium of claim 13, wherein the computer-executable instructions cause the processing system to:
- provide a first graphical indication of a first performance impact associated with the first potential trajectory; and
- provide a second graphical indication of a second performance impact associated with the second potential trajectory.

16. The computer-readable medium of claim 13, wherein the first potential trajectory is configured to maximize a performance attribute associated with operating the vehicle and the second potential trajectory is configured to minimize the performance attribute.

17. The computer-readable medium of claim 16, wherein the performance attribute comprises one of cost, fuel consumption and travel time.

18. The computer-readable medium of claim 10, wherein the graphical indication of the input query comprises a graphical element on the navigational map at a position corresponding to an input value for a first parameter of the one or more parameters.

19. The computer-readable medium of claim 18, wherein:
the input value for the first parameter comprises an altitude constraint for a waypoint; and
the graphical element comprises a graphical representation of the waypoint on the navigational map at a position corresponding to the altitude constraint.

20. A vehicle system comprising:
a display device having a navigational map display rendered thereon;
one or more systems to provide current status information for a vehicle; and
a processing system coupled to the display device and the one or more systems to identify one or more input query parameters for a prospective action by the vehicle to modify operation of the vehicle, identify one or more performance constraints for the vehicle, determine a capability envelope for the vehicle for satisfying the one or more input query parameters for the prospective action based at least in part on the current status information and the one or more performance constraints, provide a graphical indication of the one or more input query parameters with respect to a reference trajectory for the vehicle on the navigational map display, and provide one or more graphical indicia of the capability envelope with respect to the reference trajectory on the navigational map display, wherein the capability envelope comprises a plurality of potential trajectories for the vehicle different from the reference trajectory for the vehicle.

\* \* \* \* \*